United States Patent
Gove et al.

(10) Patent No.: US 11,450,142 B2
(45) Date of Patent: *Sep. 20, 2022

(54) OPTICAL BIOMETRIC SENSOR WITH AUTOMATIC GAIN AND EXPOSURE CONTROL

(71) Applicant: Synaptics Incorporated, San Jose, CA (US)

(72) Inventors: Robert J. Gove, Los Gatos, CA (US); Alvin Jee, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 17/005,742

(22) Filed: Aug. 28, 2020

(65) Prior Publication Data
US 2020/0394386 A1 Dec. 17, 2020

Related U.S. Application Data

(63) Continuation of application No. 15/789,881, filed on Oct. 20, 2017, now Pat. No. 10,789,450.

(51) Int. Cl.
*G06V 40/13* (2022.01)
*G06V 40/12* (2022.01)

(52) U.S. Cl.
CPC .......... *G06V 40/1382* (2022.01); *G06V 40/13* (2022.01); *G06V 40/1318* (2022.01)

(58) Field of Classification Search
CPC ........... G06V 40/1382; G06V 40/1318; G06V 40/13; G06K 9/00107; G06K 9/00013; G06K 9/0004
See application file for complete search history.

(56) References Cited

U.S. PATENT DOCUMENTS

| 6,529,242 B1 | 3/2003 | Panicacci |
| 6,809,766 B1 | 10/2004 | Krymski et al. |
| 6,864,916 B1 | 3/2005 | Nayar et al. |
| 7,123,755 B2 | 10/2006 | Shigeta |
| 7,573,516 B2 | 8/2009 | Krymski et al. |
| 8,558,815 B2* | 10/2013 | Van Genechten ...... G06F 3/038 345/173 |
| 10,922,398 B2* | 2/2021 | He .......................... G06V 10/17 |
| 10,949,643 B2* | 3/2021 | He ...................... G02F 1/13318 |

(Continued)

FOREIGN PATENT DOCUMENTS

| CN | 104733484 A | 6/2015 |
| CN | 104866834 A | 8/2015 |
| CN | 107247948 A | 10/2017 |

OTHER PUBLICATIONS

U.S. Appl. No. 15/789,881, filed Oct. 20, 2017.

*Primary Examiner* — Manav Seth
(74) *Attorney, Agent, or Firm* — Leydig, Voit & Mayer, Ltd.

(57) ABSTRACT

An optical imaging device for imaging a biometric input object is provided. The optical imaging device includes an optical sensor having an array of sensing elements. The optical sensor is configured to first read a first subset of sensing elements in the array of sensing elements; analyze the first read of the first subset of sensing elements to determine an ambient light condition; first alter an operating point of the optical imaging device based on the ambient light condition; and image the input object.

20 Claims, 9 Drawing Sheets

(56) References Cited

U.S. PATENT DOCUMENTS

| | | |
|---|---|---|
| 2005/0036048 A1 | 2/2005 | Fowler |
| 2005/0057674 A1 | 3/2005 | Krymski et al. |
| 2005/0243193 A1 | 11/2005 | Gove et al. |
| 2008/0191298 A1 | 8/2008 | Lin et al. |
| 2008/0205713 A1 | 8/2008 | Nagashita |
| 2010/0073535 A1 | 3/2010 | Huggett et al. |
| 2010/0118167 A1 | 5/2010 | Johnson |
| 2010/0309333 A1 | 12/2010 | Smith et al. |
| 2012/0062772 A1 | 3/2012 | Osawa et al. |
| 2012/0274822 A1 | 11/2012 | Smith et al. |
| 2013/0214125 A1 | 8/2013 | Solhusvik et al. |
| 2014/0078349 A1 | 3/2014 | Velichko et al. |
| 2014/0078366 A1 | 3/2014 | Dokoutchaev et al. |
| 2015/0009378 A1 | 1/2015 | Kim |
| 2015/0054973 A1 | 2/2015 | Velichko |
| 2015/0054997 A1 | 2/2015 | Hynecek |
| 2015/0055002 A1 | 2/2015 | Beck |
| 2015/0015332 A1 | 4/2015 | Hynecek et al. |
| 2015/0229889 A1 | 4/2015 | Boettiger |
| 2015/0350582 A1 | 12/2015 | Korobov et al. |

\* cited by examiner

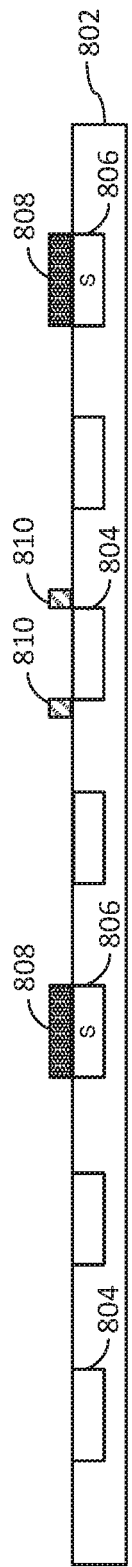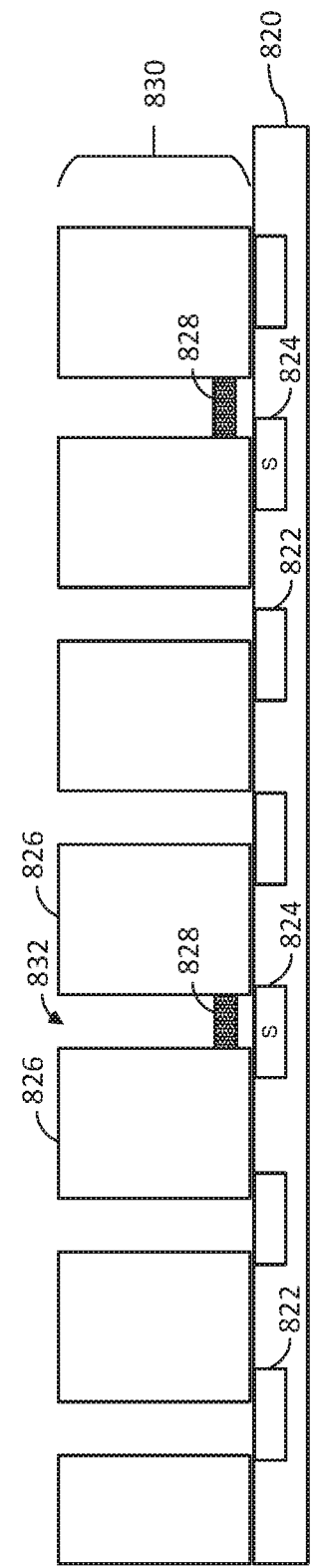

OPTICAL BIOMETRIC SENSOR WITH AUTOMATIC GAIN AND EXPOSURE CONTROL

CROSS REFERENCE TO RELATED APPLICATIONS

This application is a continuation of U.S. patent application Ser. No. 15/789,881, entitled "Optical Biometric Sensor with Automatic Gain and Exposure Control," filed Oct. 20, 2017, the contents of which are expressly incorporated by reference.

FIELD

This disclosure generally relates to optical sensors, and more particularly to an optical sensor having gain and exposure control.

BACKGROUND

Object imaging is useful in a variety of applications. By way of example, biometric recognition systems image biometric objects for authenticating and/or verifying users of devices incorporating the recognition systems. Biometric imaging provides a reliable, non-intrusive way to verify individual identity for recognition purposes. Various types of sensors may be used for biometric imaging.

Fingerprints are an example of a biometric object that may be imaged. Fingerprints, like various other biometric characteristics, are based on distinctive personal characteristics and thus provide a reliable mechanism to recognize an individual. Thus, fingerprint sensors have many potential applications. For example, fingerprint sensors may be used to provide access control in stationary applications, such as security checkpoints. Fingerprint sensors may also be used to provide access control in mobile devices, such as cell phones, wearable smart devices (e.g., smart watches and activity trackers), tablet computers, personal data assistants (PDAs), navigation devices, and portable gaming devices. Accordingly, some applications, in particular applications related to mobile devices, may require recognition systems that are both small in size and highly reliable.

Fingerprint sensors in most mobile devices are capacitive sensors having a capacitive sensing array configured to sense ridge and valley features of a fingerprint. Typically, these fingerprint sensors either detect absolute capacitance (sometimes known as "self-capacitance") or trans-capacitance (sometimes known as "mutual capacitance"). In either case, capacitance at each sensing element in the array varies depending on whether a ridge or valley is present, and these variations are electrically detected to form an image of the fingerprint.

While capacitive fingerprint sensors provide certain advantages, most commercially available capacitive fingerprint sensors have difficulty sensing fine ridge and valley features through large distances, requiring the fingerprint to contact a sensing surface that is close to the sensing array. It remains a significant challenge for a capacitive sensor to detect fingerprints through thick layers, such as the thick cover glass (sometimes referred to herein as a "cover lens") that protects the display of many smart phones and other mobile devices. To address this issue, a cutout is often formed in the cover glass in an area beside the display, and a discrete capacitive fingerprint sensor (often integrated with a button) is placed in the cutout area so that it can detect fingerprints without having to sense through the cover glass.

The need for a cutout makes it difficult to form a flush surface on the face of device, detracting from the user experience, and complicating the manufacture. The existence of mechanical buttons also takes up valuable device real estate.

Optical sensors provide an alternative to capacitive sensors. Unfortunately, conventional optical fingerprint sensors are too bulky to be packaged in mobile devices and other common consumer electronic devices, confining their use to door access control terminals and similar applications where sensor size is not a restriction. In addition, optical sensors can be affected by differing ambient lighting conditions. For example, an optical fingerprint sensor may provide satisfactory imaging of a fingerprint when subjected to indoor lighting, but that same fingerprint sensor may become saturated when subjected to sunlight thereby preventing or inhibiting the ability to image a fingerprint.

SUMMARY

One embodiment provides an optical imaging device for imaging a biometric input object. The optical imaging devices includes an optical sensor array including an array of sensing elements; and a control circuit. The control circuit is configured to first read a first subset of sensing elements in the array of sensing elements; analyze the first read of the first subset of sensing elements to determine if one or more sensing elements of the first subset of sensing elements is saturated; first alter an operating point of the optical imaging device; and image the input object.

Another embodiment provides an optical imaging device for imaging a biometric input object. The optical imaging device includes an optical sensor array including a plurality of unmasked sensing elements, the plurality of unmasked sensing elements being configured to image an input object; and a plurality of masked sensing element. The masked sensing elements include a first sensing element disposed below a first spatial light blocking mask, the first spatial light blocking mask configured to allow a first amount of light to reach a sensing area of the first sensing element; and a second sensing element disposed below a second spatial light blocking mask, the second spatial light blocking mask configured to allow a second amount of light to reach a sensing area of the second sensing element; wherein the first amount of light is different from the second amount of light.

Another embodiment provides a method of imaging a biometric input object using an optical sensor array having a plurality of optical sensing elements. The method includes first reading a subset of sensing elements in the optical sensor array; analyzing the first reading of the subset of sensing elements to determine an ambient light condition; altering an operating point based on the ambient light condition; and imaging the input object using the optical sensor array.

BRIEF DESCRIPTION OF THE DRAWINGS

FIGS. 8A-8B illustrate examples of light blocking structure disposed relative to an array of optical sensing elements.

DETAILED DESCRIPTION

The following detailed description is exemplary in nature and is not intended to limit the invention or the application and uses of the invention. Furthermore, there is no intention to be bound by any expressed or implied theory presented in the preceding technical field, background, summary, brief description of the drawings, or the following detailed description.

Turning to the drawings, and as described in greater detail herein, embodiments provide systems and methods to optically image an input object, such as a biometric input object, including but not limited to a fingerprint. In particular, systems and methods are described for a biometric sensor which can image a biometric in a variety of ambient lighting conditions including bright light, e.g., sunlight. The systems and methods provide for optical sensitivity reduction for a single-frame snapshot to measure bright ambient illumination thereby obviating the need for multiple frames to achieve the same result as found in prior systems, which prior systems thus require more power and more latency.

Various solutions are disclosed. In one embodiment, no special optical sensing elements (also called "pixels") are used. Instead, the system and method sample a subset of optical sensing elements in an array of optical sensing elements. The results are used to adjust the gain and exposure control to place the optical sensor in a suitable operating range for optical imaging of the input object, e.g., fingerprint. In other embodiments, a subset of optical sensing elements are configured with sensing element filters, e.g., spatial light blocking masks. These masks variably and partially block light from reaching the optical sensing elements thereby preventing at least some sensing elements from becoming saturated even in bright light conditions. Readings from the partially blocked optical sensing elements may then be used to adjust the gain and exposure to place the optical sensor in a suitable operating range for optical imaging of the input object. Alternatively, the readings may be used for other purposes, such as adjusting another parameter or setting of a device containing the optical sensor based on the readings. The system and method may be used in conjunction with a light filter layer, such as a collimator. In the case of a collimator, a pitch of collimator apertures may or may not match the pitch of the optical sensing elements and the collimator may or may not be aligned with the optical sensor.

Figure 1:
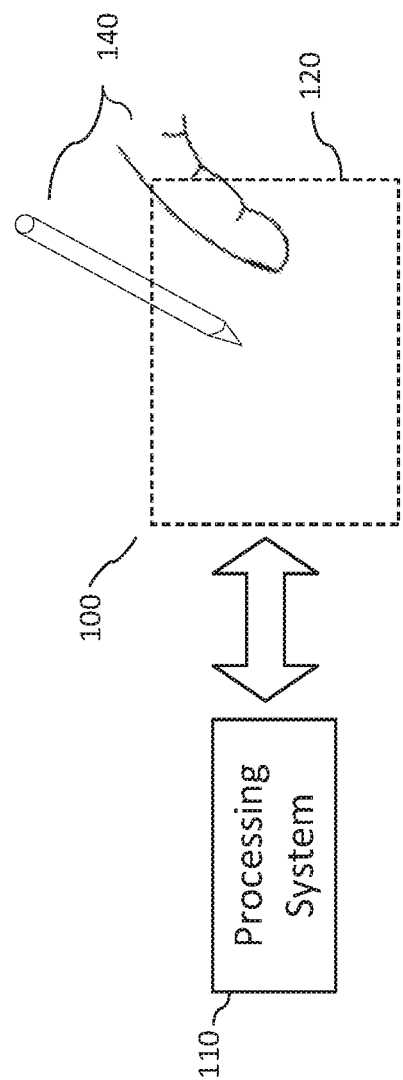
FIG. 1 is a block diagram of an example of a system that includes an optical sensor and a processing system.

FIG. 1 is a block diagram of an exemplary sensing system having a sensor 100, in accordance with embodiments of the disclosure. The sensor 100 may be configured to provide input to an electronic system (also "electronic device"). Some non-limiting examples of electronic systems include personal computers of all sizes and shapes, such as desktop computers, laptop computers, netbook computers, tablets, e-book readers, personal digital assistants (PDAs), and wearable computers (such as smart watches and activity tracker devices). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The sensor 100 can be implemented as a physical part of the electronic system, or can be physically separate from the electronic system. The sensor 100 may be integrated as part of a display of an electronic device. As appropriate, the sensor 100 may communicate with parts of the electronic system using any one or more of the following: buses, networks, and other wired or wireless interconnections. Examples include I2C, SPI, PS/2, Universal Serial Bus (USB), Bluetooth, RF, and IRDA.

The sensor 100 is configured to sense input provided by one or more input objects 140 in a sensing region 120. In one embodiment, the input object 140 is a finger, and the sensor 100 is implemented as a fingerprint sensor (also "fingerprint scanner") configured to detect fingerprint features of the input object 140. In other embodiments, the sensor 100 may be implemented as vascular sensor (e.g., for finger vein recognition), hand geometry sensor, or a proximity sensor (such as a touch pad, touch screen, and or other touch sensor device). In other embodiments, the sensor may be used for heart rate detection by monitoring dynamic changes in reflectance of the image.

Sensing region 120 encompasses any space above, around, in, and/or near the sensor 100 in which the sensor 100 is able to detect input (e.g., user input provided by one or more input objects 140). The sizes, shapes, and locations of particular sensing regions may vary widely from embodiment to embodiment. In some embodiments, the sensing region 120 extends from a surface of the sensor 100 in one or more directions into space. In various embodiments, input surfaces may be provided by surfaces of casings within which sensor elements reside, by face sheets applied over the sensor elements or any casings, etc. In some embodiments, the sensing region 120 has a rectangular shape when projected onto an input surface of the input device 100.

The sensor 100 may utilize any combination of sensor components and sensing technologies to detect user input in the sensing region 120. The sensor 100 comprises one or more detector elements (or "sensing elements") for detecting user input. Some implementations utilize arrays or other regular or irregular patterns of sensing elements to detect the input object 140.

In the optical implementations of the input device 100 set forth herein, one or more detector elements (also referred to as optical sensing elements) detect light from the sensing region. In various embodiments, the detected light may be reflected from input objects in the sensing region, emitted by input objects in the sensing region, or some combination thereof. Example optical detector elements include photo-diodes, CMOS arrays, CCD arrays, and other types of photosensors configured to detect light in the visible or invisible spectrum (such as infrared or ultraviolet light). The photosensors may be thin film photodetectors, such as thin film transistors (TFTs) or thin film diodes.

Some optical implementations provide illumination to the sensing region. Reflections from the sensing region in the illumination wavelength(s) are detected to determine input information corresponding to the input object.

Some optical implementations rely on principles of direct illumination of the input object, which may or may not be in contact with an input surface of the sensing region depending on the configuration. One or more light sources and/or light guiding structures may be used to direct light to the sensing region. When an input object is present, this light is reflected from surfaces of the input object, which reflections can be detected by the optical sensing elements and used to determine information about the input object.

Some optical implementations rely on principles of internal reflection to detect input objects in contact with the input surface of the sensing region. One or more light sources may be used to direct light in a transmitting medium at an angle at which it is internally reflected at the input surface of the sensing region, due to different refractive indices at opposing sides of the boundary defined by the sensing surface. Contact of the input surface by the input object causes the refractive index to change across this boundary, which alters the internal reflection characteristics at the input surface. Higher contrast signals can often be achieved if principles of frustrated total internal reflection (FTIR) are used to detect the input object. In such embodiments, the light may be directed to the input surface at an angle of incidence at which it is totally internally reflected, except where the input object is in contact with the input surface and causes the light to partially transmit across this interface. An example of this is presence of a finger introduced to an input surface defined by a glass to air interface. The higher refractive index of human skin compared to air causes light incident at the input surface at the critical angle of the interface to air to be partially transmitted through the finger, where it would otherwise be totally internally reflected at the glass to air interface. This optical response can be detected by the system and used to determine spatial information. In some embodiments, this can be used to image small scale fingerprint features, where the internal reflectivity of the incident light differs depending on whether a ridge or valley is in contact with that portion of the input surface.

Some implementations are configured to provide images that span one, two, three, or higher dimensional spaces. The input device may have a sensor resolution that varies from embodiment to embodiment depending on factors such as the particular sensing technology involved and/or the scale of information of interest. For example, some biometric sensing implementations may be configured to detect physiological features of the input object (such as fingerprint ridge features of a finger, or blood vessel patterns of an eye), which may utilize higher sensor resolutions and present different technical considerations from some proximity sensor implementations that are configured to detect a position of the input object with respect to the sensing region (such as a touch position of a finger with respect to an input surface). In some embodiments, the sensor resolution is determined by the physical arrangement of an array of sensing elements, where smaller sensing elements and/or a smaller pitch can be used to define a higher sensor resolution.

In some embodiments, the sensor 100 is implemented as a fingerprint sensor having a sensor resolution high enough to capture features of a fingerprint. In some implementations, the fingerprint sensor has a resolution sufficient to capture minutia (including ridge endings and bifurcations), orientation fields (sometimes referred to as "ridge flows"), and/or ridge skeletons. These are sometimes referred to as level 1 and level 2 features, and in an exemplary embodiment, a resolution of at least 250 pixels per inch (ppi) is capable of reliably capturing these features. In some implementations, the fingerprint sensor has a resolution sufficient to capture higher level features, such as sweat pores or edge contours (i.e., shapes of the edges of individual ridges). These are sometimes referred to as level 3 features, and in an exemplary embodiment, a resolution of at least 750 pixels per inch (ppi) is capable of reliably capturing these higher level features.

In some embodiments, the fingerprint sensor is implemented as a placement sensor (also "area" sensor or "static" sensor) or a swipe sensor (also "slide" sensor or "sweep" sensor). In a placement sensor implementation, the sensor is configured to capture a fingerprint input as the user's finger is held stationary over the sensing region. Typically, the placement sensor includes a two dimensional array of sensing elements capable of capturing a desired area of the fingerprint in a single frame. In a swipe sensor implementation, the sensor is configured to capture to a fingerprint input based on relative movement between the user's finger and the sensing region. Typically, the swipe sensor includes a linear array or a thin two-dimensional array of sensing elements configured to capture multiple frames as the user's finger is swiped over the sensing region. The multiple frames may then be reconstructed to form an image of the fingerprint corresponding to the fingerprint input. In some implementations, the sensor is configured to capture both placement and swipe inputs.

In some embodiments, the fingerprint sensor is configured to capture less than a full area of a user's fingerprint in a single user input (referred to herein as a "partial" fingerprint sensor). Typically, the resulting partial area of the fingerprint captured by the partial fingerprint sensor is sufficient for the system to perform fingerprint matching from a single user input of the fingerprint (e.g., a single finger placement or a single finger swipe). Some example imaging areas for partial placement sensors include an imaging area of 100 mm$^2$ or less. In another exemplary embodiment, a partial placement sensor has an imaging area in the range of 20-50 mm$^2$. In some implementations, the partial fingerprint sensor has an input surface that is the same size as the imaging area.

While the input device is generally described in the context of a fingerprint sensor in FIG. 1, embodiments include other biometric sensor devices. In various embodiments, a biometric sensor device may be configured to capture physiological biometric characteristics of a user. Some example physiological biometric characteristics include fingerprint patterns, vascular patterns (sometimes known as "vein patterns"), palm prints, and hand geometry.

In FIG. 1, a processing system 110 is shown in communication with the input device 100. The processing system 110 comprises parts of or all of one or more integrated circuits (ICs) including microprocessors, microcontrollers and the like and/or other circuitry components. In some embodiments, the processing system may be configured to operate hardware of the input device to capture input data, and/or implement a biometric process or other process based on input data captured by the sensor 100.

In some implementations, the processing system 110 is configured to operate sensor hardware of the sensor 100 to detect input in the sensing region 120. In some implementations, the processing system comprises driver circuitry configured to drive signals with sensing hardware of the input device and/or receiver circuitry configured to receive signals with the sensing hardware. For example, a processing system for an optical sensor device may comprise driver circuitry configured to drive illumination signals to one or more LEDs, an LCD backlight or other light sources, and/or receiver circuitry configured to receive signals with optical receiving elements.

In some embodiments, the processing system 110 comprises electronically-readable instructions, such as firmware code, software code, and/or the like. In some embodiments, the processing system 110 includes memory for storing electronically-readable instructions and/or other data, such as reference templates for biometric recognition. The processing system 110 can be implemented as a physical part of the sensor 100, or can be physically separate from the sensor 100. The processing system 110 may communicate with parts of the sensor 100 using buses, networks, and/or other wired or wireless interconnections. In some embodiments, components composing the processing system 110 are located together, such as near sensing element(s) of the sensor 100. In other embodiments, components of processing system 110 are physically separate with one or more components close to sensing element(s) of sensor 100, and one or more components elsewhere. For example, the sensor 100 may be a peripheral coupled to a computing device, and the processing system 110 may comprise software configured to run on a central processing unit of the computing device and one or more ICs (perhaps with associated firmware) separate from the central processing unit. As another example, the sensor 100 may be physically integrated in a mobile device, and the processing system 110 may comprise circuits and/or firmware that are part of a central processing unit or other main processor of the mobile device. In some embodiments, the processing system 110 is dedicated to implementing the sensor 100. In other embodiments, the processing system 110 performs functions associated with the sensor and also performs other functions, such as operating display screens, driving haptic actuators, running an operating system (OS) for the electronic system, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes. In one or more embodiments, a first and second module may be comprised in separate integrated circuits. For example, a first module may be comprised at least partially within a first integrated circuit and a separate module may be comprised at least partially within a second integrated circuit. Further, portions of a single module may span multiple integrated circuits.

In some embodiments, the processing system 110 responds to user input (or lack of user input) in the sensing region 120 directly by causing one or more actions. Example actions include unlocking a device or otherwise changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the sensor 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, authenticate a user, and the like.

In some embodiments, the sensing region 120 of the sensor 100 overlaps at least part of an active area of a display screen, such as embodiments where the sensor 100 comprises a touch screen interface and/or biometric sensing embodiments configured to detect biometric input data over the active display area. For example, the sensor 100 may comprise substantially transparent sensor electrodes. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The display screen may also be flexible or rigid, and may be flat, curved, or have other geometries. In some embodiments, the display screen includes a glass or plastic substrate for TFT circuitry and/or other circuitry, which may be used to provide visuals and/or provide other functionality. In some embodiments, the display device includes a cover lens (sometimes referred to as a "cover glass") disposed above display circuitry which may also provide an input surface for the input device. Example cover lens materials include plastic, optically clear amorphous solids, such as chemically hardened glass, as well as optically clear crystalline structures, such as sapphire. In accordance with the disclosure, the sensor 100 and the display screen may share physical elements. For example, some embodiments may utilize some of the same electrical components for displaying visuals and for input sensing. In one embodiment, one or more display electrodes of a display device may configured for both display updating and input sensing. As another example, the display screen may be operated in part or in total by the processing system 110 in communication with the input device.

Figure 2:
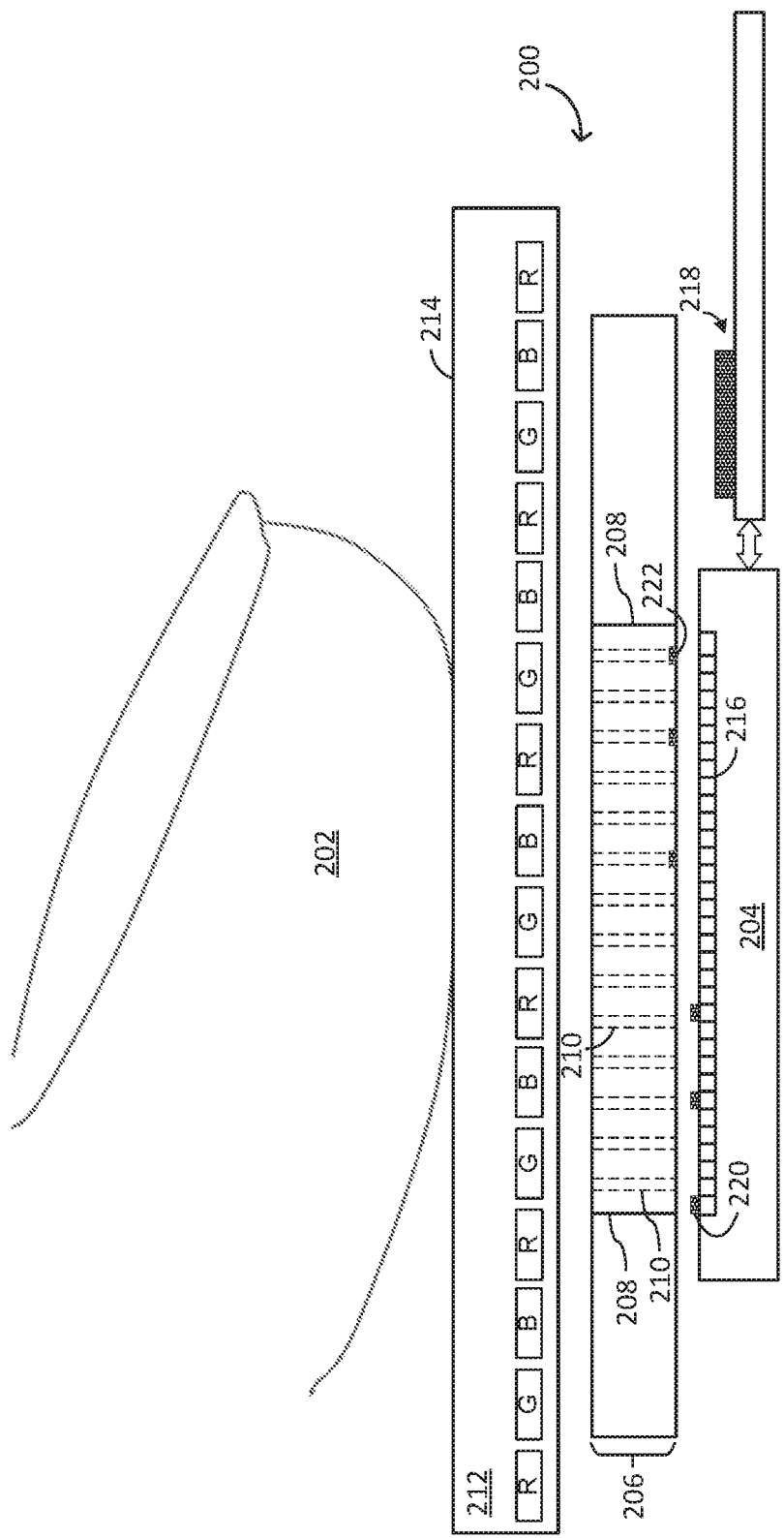
FIG. 2 illustrates an example of an optical sensor according to an embodiment.

FIG. 2 illustrates a stack up of an example of an optical imaging device 200 used to image an input object 202, such as a fingerprint or other biometric. The optical imaging device 200 includes an optical sensor 204 and, in certain embodiments, a filter layer 206. Also shown is cover layer 212. The cover layer 212 protects the inner components of the optical imaging device 200 such as the optical sensor 204 and the filter layer 206. The cover layer 212 may include a cover glass or cover lens. In certain embodiments, the cover layer 212 includes a display stack, such as an OLED display illustratively depicted as having Red (R), Green (G) and Blue (B) pixels—although the display stack may be classified as a separate layer and may include pixels of any color. Further, in some embodiments other display stacks such as microLED displays or other emissive displays can be used. The optical imaging device 200 may be used to image an input object 202 over any part of an overall display, over designed portions of the display, or over a cover lens or glass without a display. It will be understood that the optical imaging device 200 as well as each of the layers is shown in simplified form. The optical imaging device 200 may include other layers and the various layers may include components and sub-layers that are not shown.

A sensing region for the input object 202 is defined above the cover layer 212. The sensing region includes sensing surface 214 formed by a top surface of the cover layer 212, which provides a contact area for the input object 202 (e.g., fingerprint or more generally biometric). As previously described above, the sensing region may extend above the sensing surface 214. Thus, the input object 202 need not contact the sensing surface 214 to be imaged.

Although generally described in the context of fingerprint for illustrative purposes, the input object 202 is any object to be imaged. Generally, the input object 202 will have various features. For example, in the case of a fingerprint, the input object 202 has ridges and valleys which may be optically imaged. Illumination of the input object 202 for imaging may be provided by display components, e.g., OLEDs and/or by a separate light source (not shown) which may be mounted under or above the filter layer 206. When the light source is mounted below the filter layer 206, portions of the filter layer 206 may be transparent to allow light to reach cover layer 212 and sensing surface 214.

The optical imaging device 200 may include light filter 208 within the filter layer 206 for conditioning of light reflected from the input object 202 and/or at the sensing surface 214. In the particular example, the light filter 208 is a collimator, however, it will be understood that different types of light filters may be used. When deployed as a collimator, the light filter 208 includes an array of apertures, or holes, 210 with each aperture 210 being generally above one or more optical sensing elements of the optical sensor 204 such that light passing through the apertures 210 reaches the sensing elements. The array of apertures 210 may form a regular or irregular pattern. The apertures 210 may be voids or may be made of transparent material, or a combination thereof, and may be formed using additive or subtractive methods (e.g., laser, drilling, etching, punch and the like). In areas other than apertures 210, the light filter 208 includes material (e.g., metal) that will block, reflect, absorb or otherwise occlude light. Thus, the light filter 208 generally only permits light rays reflected from the input object 202 (e.g., finger) or sensing surface 214 at normal or near normal incidence (relative to a longitudinal plane defined by a longitudinal axis of the filter layer 206) to pass and reach the optical sensing elements of the optical sensor 204. It should be understood that the collimator can be manufactured using any other suitable methods or materials, and further, that the collimator or portions thereof can additionally or alternatively permit other non-normal light rays to reach the sensor (e.g., with an angled or tilted angle of acceptance).

The optical sensor 204 is disposed below the filter layer 206 and includes an optical sensor array 216 comprising an array of optical sensing elements, with one or more sensing elements in the optical sensor array being disposed generally below an aperture 210 of the light filter 208. Optical sensing elements in the optical sensor array 216 detect the intensity of light passing through the light filter 208 and which becomes incident on one or more of the sensing elements. Examples of the optical sensor 204 include a CMOS image sensor which may be formed from a semiconductor die, such as a CMOS Image Sensor (CIS) Die, or a TFT-based sensor formed on a non-conductive substrate, such as glass.

A control circuit 218 is electrically and logically connected to the optical sensor 204. The control circuit 218 generally controls operation of the optical sensor 204—for example, reads the values of the optical sensing elements within the sensor array 216 as part of a biometric imaging process, controls sensor exposure (integration) time and signal gain, and the like. The control circuit 218 may include a processor, memory and/or discrete components. The control circuit 218 may be separate, as generally shown, or may be partially or entirely integrated with the optical sensor 204.

In the embodiment shown, the light filter layer 206 (e.g., collimator) is shown above and somewhat spaced apart from the optical sensor 204. It will be understood that the light filter layer 206 may be disposed directly on top of the optical sensor 204. In certain embodiments, the light filter layer 206 may be formed as an integrated part of the optical sensor, such as by forming a collimator in a CMOS sensor through removal or selective deposition of material. As will be discussed below, spatial light blocking masks may be formed within, for example, apertures 210 of the light filter layer 206.

To achieve optical sensing of features such as fingerprints and fingerprint-sized features through cover layer 212, light reflected from the input object 202 and/or sensing surface 214 may be conditioned by the light filter 208 so that the light reaching a sensing element in the sensor array 216 comes only from a small spot on the input object 202 and/or sensing surface 214, generally above the sensor element. In the absence of such conditioning, any light arriving at a sensing element from a region on the input object 202 far away from the optical sensing elements contributes to image blurring. The light filter 208 provides such light conditioning for the optical imaging device 200 by only allowing light traversing the apertures 210 to reach the sensor array 216 and, thus, to reach the optical sensor elements.

In general terms, each optical sensing element in the sensor array 216 collects (integrates) light over time (integration time) $\Delta T$ and coverts the collected light into an electrical signal. The electrical signal, which may be amplified, is read out by the control circuit 218 and may be converted to digital form. The time period during which each sensing element collects light ($\Delta T$) before being read is referred to as the exposure time or simply exposure. The amount of amplification is referred to as the gain. For an optical sensor, an example of a typical integration time is on the order of 160 ms with 16 ms being required to read the entire optical sensor array. It will be understood that these times can vary greatly depending on the configuration of the optical sensor, number of individual optical sensing elements, number of rows and the like.

In certain lighting conditions, such as sunlight, ambient surrounding light can reach the individual sensing elements of the optical sensor 204 with sufficient intensity to saturate some or all of the sensing elements for a given exposure time. Saturation can also effectively occur as the result of amplification of a large sensor signal. Naturally, saturation of the sensing elements may interfere with, and possibly preclude, the ability to effectively image the input object. The systems and methods described herein address this problem in various ways as described in more detail in the description which follows. In general, however, systems and methods are used to read out a subset of sensing elements, analyze the readings, and adjust the gain and/or exposure to place the optical sensor at an appropriate operating point for the particular ambient light conditions. The systems and methods may be used to provide for fast imaging without injecting the latency associated with prior methods.

In one example (e.g., FIG. 3A-3B), a subset of optical sensing elements in the array of sensing elements 216 forming optical sensor 204 are first read. The results of the reading are then analyzed to adjust the gain and exposure used in connection with the sensing elements until the optical imaging device 200 achieves an operating point that permits acceptable imaging of the input object, e.g., permits determination of the ridges, valleys and other features of the fingerprint. This implementation does not require the use of modified or special sensing elements (pixels).

In another example (e.g., FIGS. 5, 6, 7), special sensing elements (such as masked sensing elements or pixels or special pixels) are employed. The masked sensing elements are used in conjunction with light blocking masks (e.g., FIG. 4), which may vary in the amount of light blocked on a sensing element by sensing element basis. The light blocking masks are disposed between the object being imaged and the individual sensing elements. For example, the light blocking masks may be formed directly on top of the sensing elements as part of the optical sensor 204 as illustratively shown by light blocking masks 220. As another example, the light blocking masks may be formed as part of the light filter 208 as shown by spatial light blocking masks 222. The light blocking masks create special pixels, some of which will not saturate due to bright light as easily or quickly as unmasked pixels. As such, the special pixels may be used to read sensor values in conditions where unmasked sensing elements will be saturated. For example, special pixels may be used that have different sensitivities from each other. Based on the different sensitivities, different ones of the special pixels will respond differently from each other under a given light condition. As an example, in a bright ambient light condition, some of the special pixels (e.g., those having the lowest sensitivity to light or the smallest exposed area) may not saturate while others of the special pixels (e.g., those having higher sensitivity to light or greater exposed area) may saturate in the same light condition. The masked sensing elements may thus be used to analyze the ambient conditions and quickly adjust the gain and exposure control based on the response of the special pixels. Further, it should be noted that special photosensors of varying sizes can be used to similarly vary the sensitivity of the special pixels, without a need for masks.

In certain embodiments, the optical sensor array 216 may be operated using a rolling shutter or a global shutter. In a rolling shutter arrangement, each row of sensing elements in an array is integrated for period of time ($\Delta T_R$) with the start and end times for each row being staggered. A given row is read out following its integration time by, for example, control circuit 218 during which another row or rows may be integrated. Thus, in a rolling shutter, the time periods during which each row senses light are temporarily spaced apart, although the times periods may overlap. In a global shutter arrangement, the entire sensor array is simultaneously integrated for the time period ($\Delta T_G$) and then read out.

Figure 3A:
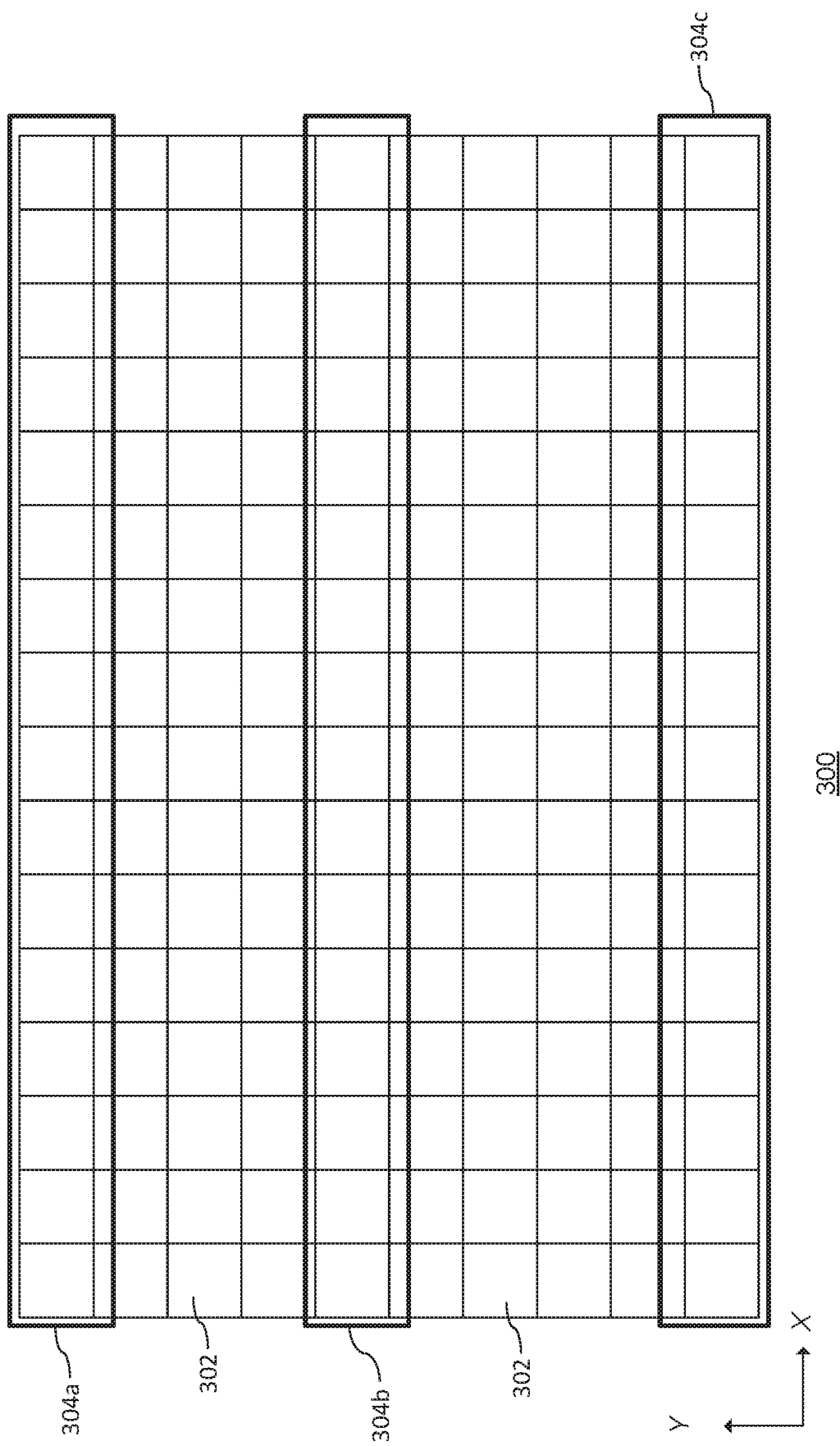
FIG. 3A illustrates an array of optical sensing elements used according to a method for automatic gain and exposure control according to an embodiment.
Figure 3B:
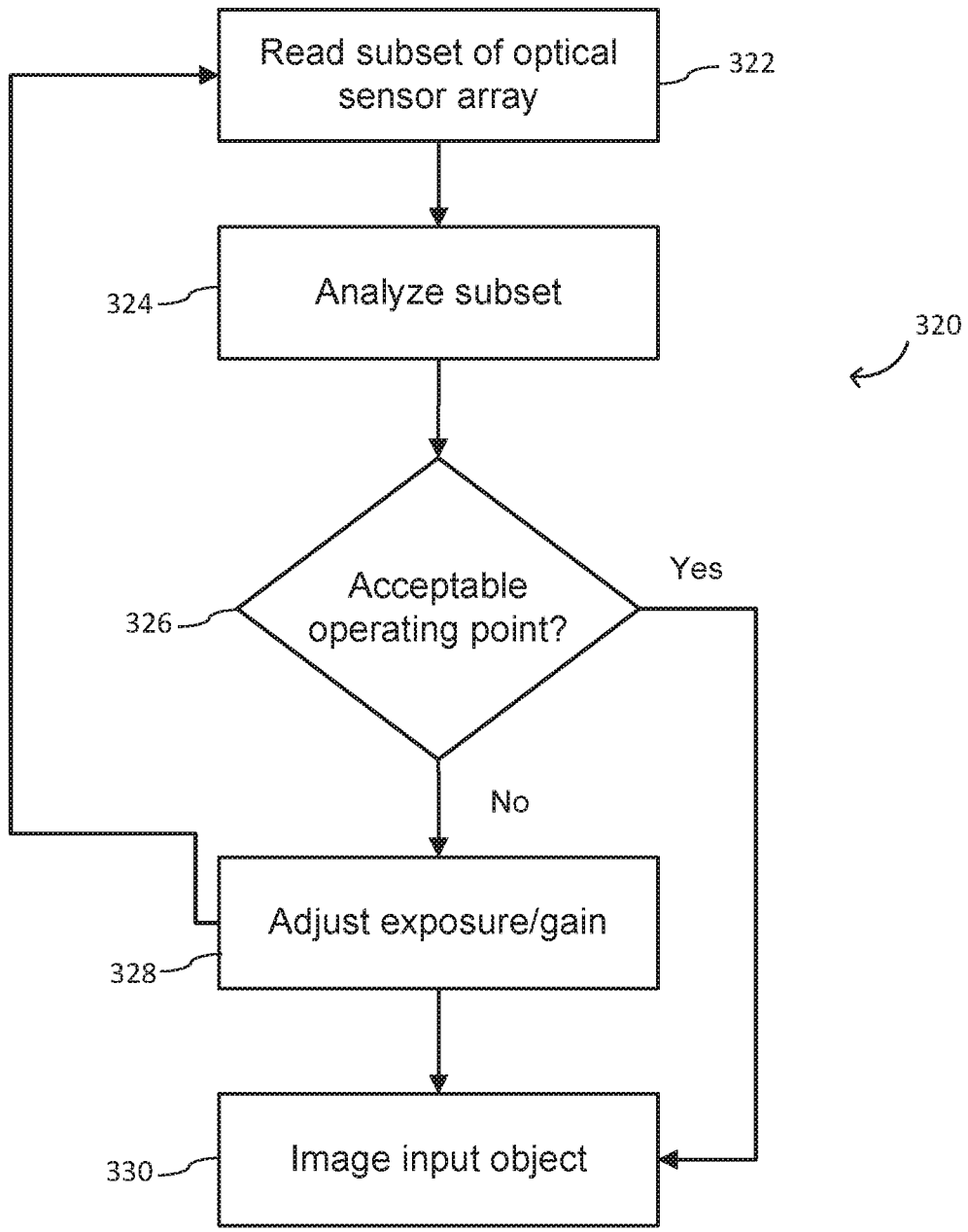
FIG. 3B illustrates a method of implementing automatic gain and exposure control according to an embodiment.

FIGS. 3A-3B illustrate an arrangement and method of automatic gain and exposure control according to certain embodiments wherein the use of masked optical sensing elements (special pixels) are not required, although they could optionally be employed.

FIG. 3A depicts an optical sensor array 300 comprising individual optical sensing elements 302 (each square represents an optical sensing element). In the example, the optical sensing elements 302 are generally shown as forming rows (along the x-axis) and columns (along the y-axis). For purposes of illustration, only a limited number of optical sensing elements are shown. However, for an in display optical sensor, many more sensing elements may be used for imaging an input object, such as a fingerprint, for example, on the order of 50K sensing elements. The arrangement shows a regular pattern of sensing elements, however, it will be understood that the individual sensing elements need not form rows and columns and that irregular patterns may also be used. No special pixels are shown or required, although they may optionally be used.

FIG. 3B illustrates a method 320 that may be used to measure ambient conditions and provide gain and/or exposure control while minimizing any impact on the latency involved in imaging an input object. As generally shown in step 322, a subset of sensing elements in the optical sensor array 300 are initially read. For example, three spaced apart rows 304a, 304b, 304c are read out by control circuit 218. Because only a subset of rows of the entire sensor array are read out, this process can occur in a fraction of time (e.g., on the order of microseconds) as compared to the time required to read out a larger portion of the optical sensor array 300 as would typically be done to image an entire image of an input object (e.g., on the order of milliseconds).

Data from the subset of rows 304a, 304b, 304c is then analyzed as shown in step 324. The results of the analysis will dictate how to proceed as shown in step 326. For example, if the subset of sensing elements provide values within an acceptable region (e.g., all or most of the sensing elements are not saturated) the method can proceed to image the entire sensing region, e.g., the entire array of sensing elements 300 such as normally occurs during a fingerprint imaging process as shown in step 330.

On the other hand, as shown in step 328, if a number of sensing elements are determined to be saturated, the gain and/or exposure of the sensor may be adjusted to move the sensor into an acceptable operating region, such as an operating region that will permit the imaging of features such as ridges and valleys. Once the exposure and/or gain are adjusted, the process may proceed directly to imaging of the input object (step 330), or return to step 322 for sampling of the same or another subset of optical sensing elements.

As an illustrative example, an optical sensor may initially be configured with an exposure time of $\Delta T=160$ ms and having a gain output of 2 times the input signal (2×). In step 322 the subset of optical sensing elements 304a, 304b, 304 are read. In step 324, the readings from the subset of optical sensors are analyzed. If it is determined that all or many of the subset of optical sensing elements are operating in unsaturated state, as may be the case where only indoor ambient light is present, the process may proceed to step 330 where an entire image of an input object is taken. If, however, all or many of the optical sensing elements of the subset are saturated, as determined in steps 324 and 326, the exposure time and/or gain may be adjusted as shown in step 328. For example, the exposure time ΔT may be reduced to 30 ms and the gain may be adjusted to 3×. The process may then repeat steps 322-326. If the optical sensing elements are still not operating within an acceptable range, the process may repeat again by, for example, adjusting the exposure time ΔT to 10 ms and the gain to 1×. The process may repeat until the optical sensor is within an acceptable operating range such that the input object may be imaged in step 330.

In the embodiment of FIGS. 3A-3B, any suitable algorithm can be used to arrive at the appropriate operating point for the optical sensor. For example, adjustment to the exposure and gain may simply follow a systematic stepping through of various values for exposure time ΔT and gain until the appropriate operating point is reached. Alternatively, or in combination therewith, the method may simply jump to known operating points. For example, it may be known that a particular gain and exposure time are known to work in direct sunlight. In such circumstances, the gain and exposure time values may be immediately set to the known values upon the initial determination of saturation in steps 324-326.

It will be understood that the particular subset of optical sensing elements 304a, 304b, 304c are shown for purposes of illustration only. For example, the subset need not comprise complete or even partial rows and could be sporadically spaced throughout the array of optical sensing elements. Of course, limiting the subset of pixels to only certain rows or partial rows will typically permit a faster readout time particularly in the context of a rolling shutter arrangement.

Figure 4:
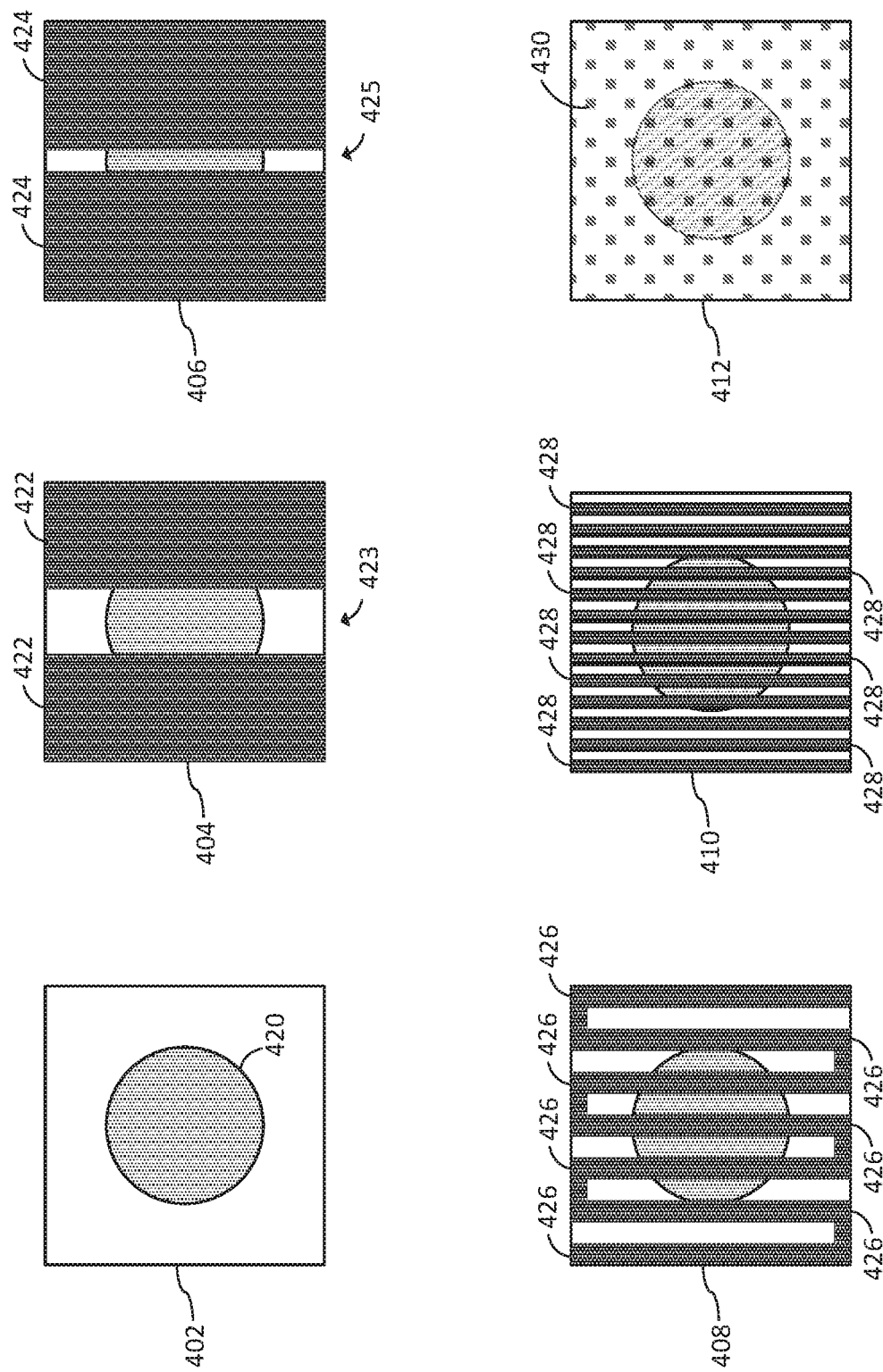
FIG. 4 illustrates examples of optical sensing elements with and without various light blocking structures.

FIG. 4 illustrates a series of individual optical sensing elements 402-412, which include various types and degrees of light blocking masks. Within each sensing element, shaded circle 420 represents a light sensitive area that collects and integrates light. Although shown as circular, it will be understood that the light sensitive area can be any shape.

Sensing element 402 includes no light blocking mask and therefore forms an unmasked sensing element or pixel. Thus, sensing area 420 of sensing element 402 will receive maximum light incident upon it.

Sensing element 404 includes a spatial light blocking mask comprising areas 422 thereby forming a special or masked sensing element or pixel. The areas 422 are designed to block (e.g., absorb, reflect or otherwise occlude or prevent) light from reaching portions of the sensing area 420. As shown, a gap or slit 423 exists between areas 422 through which light may be transmitted thereby permitting the light to reach the sensing area 420. Due to the presence of blocking areas 422, the sensing area of masked sensing element 404 receives light, but less light than unmasked sensing element 402.

Masked sensing element 406 includes a spatial light blocking mask comprising areas 424, which is similar to the arrangement described in connection with the sensing element 404. However, mask areas 424 are comparatively larger thereby resulting in a correspondingly smaller (narrower) gap or slit 425 between the mask areas 424 when compared to sensing element 404. As will be apparent, the configuration of blocking areas 424 provides for the sensing area of sensing element 406 to receive light, but less light than sensing element 404.

Masked sensing elements 408 and 410 include a spatial light blocking mask comprising a series of blocking areas 426 or 428. As shown, the arrangement of blocking areas 426 and 428 provide for a series of gaps or slits as opposed to a single gap or slit configuration as shown in connection with sensing elements 404 and 406. Due to the configuration of blocking areas 426 and 428, the sensing areas of sensing elements 408 and 410 receive light, but in varying degrees and less light than unblocked sensing element 402.

Sensing element 412 shows an alternative arrangement. Instead of using a spatial light blocking mask, the sensing element is covered by a blocking mask that comprises a light filter 430 such as filters having variable density. The light filter may be configured to, for example, block certain wavelengths of light while permitting other wavelengths to be transmitted, be polarized, or otherwise configured to reduce the intensity of light received by the sensing area.

It will be appreciated that each of the configurations of masked sensing elements 404-412 will block varying degrees of light becoming incident on the sensing elements. Thus, masked sensing elements 404-412 will not saturate as quickly or readily as unmasked sensing elements. It will further be appreciated that the examples shown and described in connection with FIG. 4 are merely intended to be examples. Any symmetrical or asymmetrical arrangement of blocking areas and/or filter media may be employed to reduce the light incident on the sensing area of the sensing element.

Moreover, the blocking or mask areas may be constructed using any suitable additive or subtractive technique. For example, the blocking areas may be constructed through the addition of a film or metal layer. In the case of metal, the metal may be coated to facilitate absorption of light. The blocking areas may be formed as part of the sensor, e.g., through for example, selective removal of material from a CMOS sensor die. A variety of locations for the blocking areas may also be used. For example, the blocking areas may be formed directly on top of the sensing elements and corresponding sensing areas. Alternatively, the blocking areas may be formed within or as part of a filter layer, e.g., within or abutting apertures of a collimator. Any suitable location may be used as long as the blocking masked are disposed between the sensing elements and input object to be imaged.

It will be appreciated that sensing element 402 is referred to as "unmasked" and sensing elements 404-408 are referred to as "masked" to indicate whether the sensing element itself has a mask regardless of whether a light filter layer is used. The use of light filter layer 206 (e.g., a collimator) may further block light from reaching either masked or unmasked pixels depending, for example, on alignment of the light filter layer with the optical sensor 204.

As described further below, certain embodiments employ an optical sensor array having a subset of sensing elements having varying spatial light blocking masks (masked sensing elements) which allow for a varying degrees of light to be blocked and consequently varying degrees of light to reach the sensing areas. These masked sensing elements allow for the determination of ambient lighting conditions even when unmasked sensing elements become saturated. The gain and exposure can then be altered to place the overall sensor at an operational point such that the image sensor can be used to, for example, image a fingerprint even in conditions such as direct sunlight.

It should be appreciated that masked sensing elements may be used for object imaging by way of a calibration step. Because the sensitively of the masked sensing elements is known by design, the masked sensing elements can be normalized with an inverse function. In this manner, masked sensing elements that are not saturated may be used for normal imaging functions.

Figure 5:
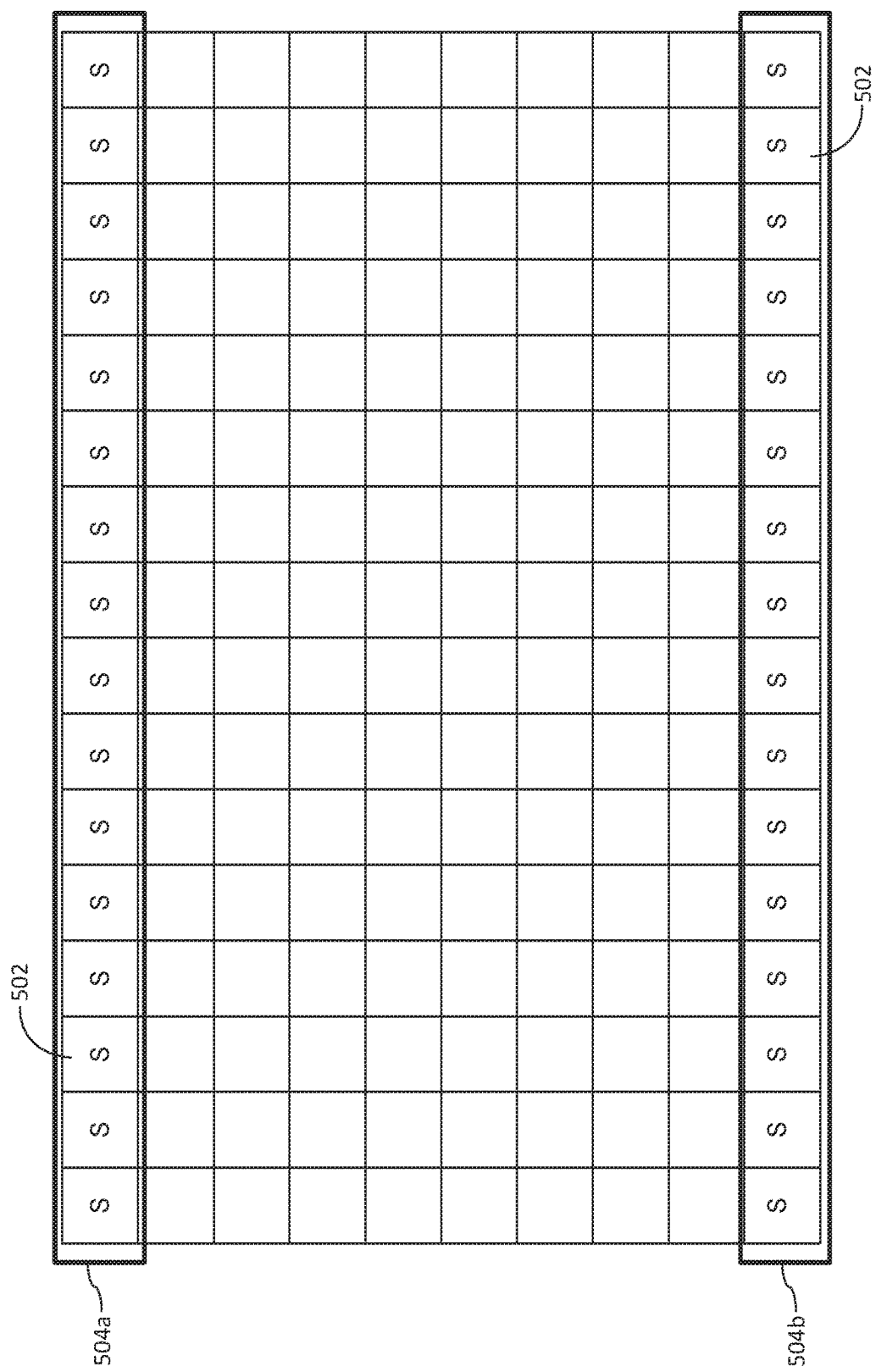
FIG. 5 illustrates an example of an array of optical sensing elements with certain sensing elements being be configured for automatic gain and exposure control.

FIG. 5 illustrates an example of an optical sensor array 500 comprising a subset of masked sensing elements 502 (also denoted with an "S"), such as those described in connection with FIG. 4, which may be used to analyze lighting conditions and implement gain and exposure adjustment. Typically, the amount of light blocked by the light blocking masks will vary. As but one illustrative example, assuming simple slit type blocking masks are used (see optical sensing elements 404 and 406 of FIG. 4), sensing elements on the far left may include the largest slits allowing for the most amount of light to reach the sensing area. Moving to the right, the sensing elements may include progressively smaller slits allowing more and more light to be blocked such that sensing elements at the far right receive the least amount of light. Of course, the same result could be obtained using any other blocking configuration, e.g., as shown by sensing elements 408, 410 or 412. In the example, the masked sensing elements are at or proximate edges of the optical sensor array 500 (rows 504a and 504b), which may correspond to an inactive region of a display.

The blocking mask applied to the masked sensing elements S need not follow a progressive arrangement. Nor do the masked sensing elements S need to be arranged in a row or at the edges of the sensor array. A variety of special pixels may be used with varying degrees of blocking masks or varying degrees of sensitivity to allow for the detection of a variety of values from the sensor elements even in varying lighting conditions including lighting conditions where unmasked pixels will be saturated. In general, location of the masked sensing elements is selected to capture events across the sensing region according to the application. For example, placing one sensing element S at the center of sensing region would be effective, but may miss cases where saturation occurs at the edges such as fingerprint applications where sunlight and shadowed features align with an active area, followed by finger placement that covers the entire active area. Thus, distribution of special masked pixels across the active area is useful in certain applications. Additionally, a number of different levels of masked sensor elements, and/or masked sensor elements with varying sensitivities is another design parameter. A continuum of increasing masked sensor elements or sensor elements with increasing sensitivities will provide more granularity at the saturation point, facilitating determination of the ideal exposure time to capture a high signal-to-noise image.

Prior to imaging an input object, such as a fingerprint, the values of the masked sensing elements S are read. Because the masked sensing elements have a variety of blocking masks, and consequently receive varying amounts of light, at least some of the masked sensing elements will provide measurable and meaningful readings (e.g., readings within the dynamic range of the optical sensing elements) regardless of the ambient light conditions. The readings from the masked sensing elements S can then be used to adjust the gain and exposure settings if needed to place the optical sensor array 500 at a suitable operating point so that an input object can be imaged.

If a suitable number of masked sensing elements S are used with a variety of blocking masks, it will usually be possible to ascertain the ambient light conditions to adjust the gain and exposure without the need to engage in an iterative process such as shown and described in connection with FIG. 3B. This flows from the fact that number of masked sensing elements coupled with the variable amount of masking may provide sufficient information to accurately assess the ambient lighting conditions without the need for repeated readings. However, an iterative process may be used if deemed necessary or desired.

As noted in connection with FIG. 2, the optical sensor may be used in connection with a light filter layer, such as a collimator. In such cases, a pitch of apertures of the collimator may or may not match the pitch the optical sensing elements in the sensor array. In addition, the apertures of the collimator or may not be aligned with individual sensing elements and/or an amount of such alignment may vary. Such arrangements will now be described in connection with the examples of FIG. 6-7.

Figure 6:
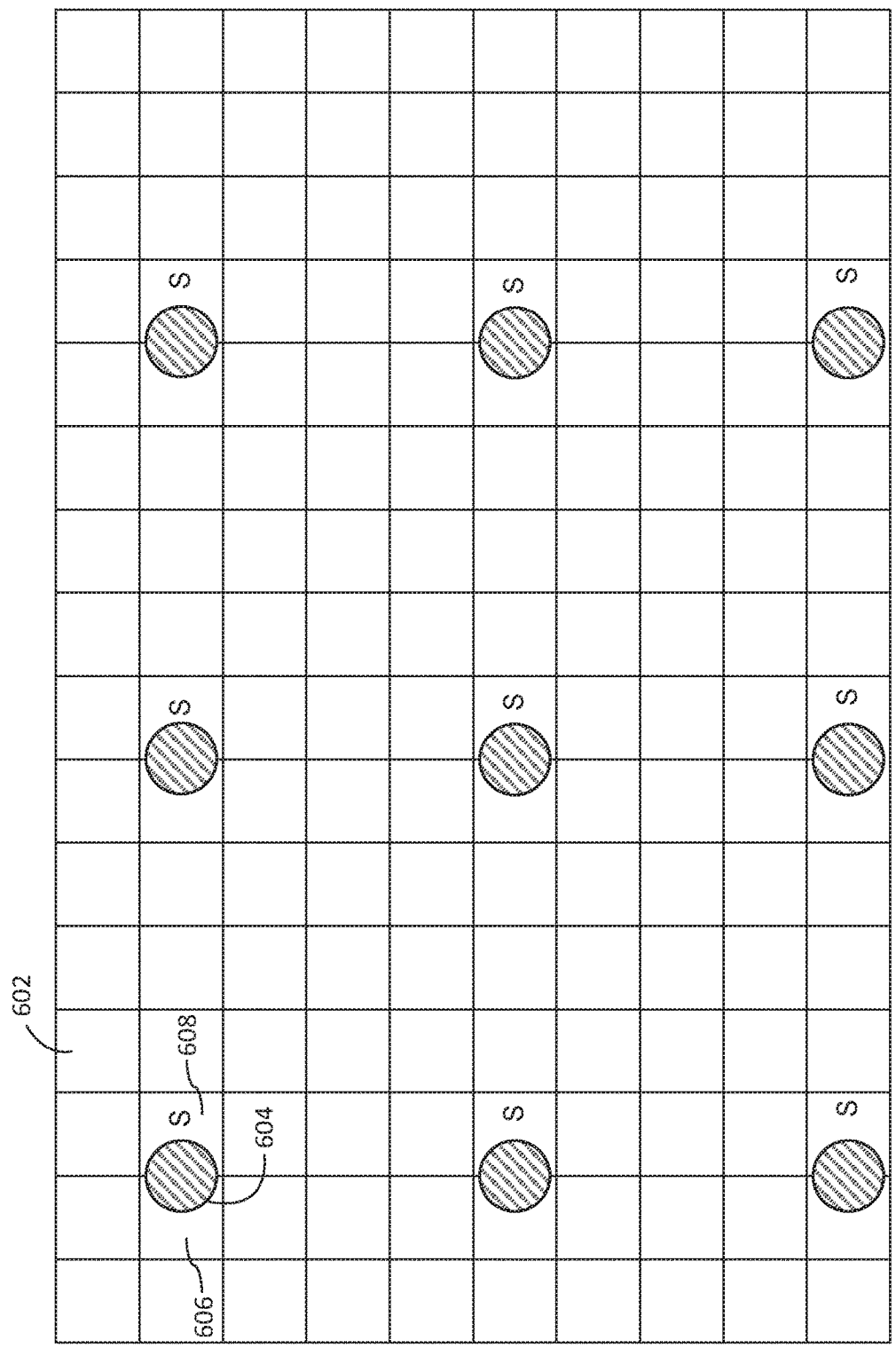
FIG. 6 illustrates an example of an array of optical sensing elements with superimposed collimator apertures, and with certain sensor elements being be configured for automatic gain and exposure control.

FIG. 6 illustrates an example of an optical sensor array 600 having various individual sensing elements 602. The optical sensor array is disposed below a collimator having openings depicted by the shaded circles 604. As can be seen, in the example, the collimator openings 604 are each above two adjacent optical sensing elements, e.g., sensing elements 606 and 608.

In accordance with the described system and method, the two adjacent sensing elements (e.g., 608 and 606) can share the collimator opening. In such an arrangement, light traversing the collimator opening may reach both adjacent sensing elements. Each collimator opening may thus be associated with an unmasked sensing element 606, used for normal input object imaging, and a masked sensing element 608 (also denoted S), used in connection with gain and exposure control. Each masked sensing element S may have some type of blocking mask (see FIG. 4). The masked sensing elements S can thus be spaced throughout the optical sensor array or only at certain locations such as rows near or proximate to the edges, center, etc. As described with reference to FIG. 5, the masked sensing elements S may have varying degrees of light blocking material and thus will provide a variety of values even in bright light conditions. In this manner, the masked sensing elements may be read and analyzed to adjust the gain and exposure as necessary.

Figure 7:
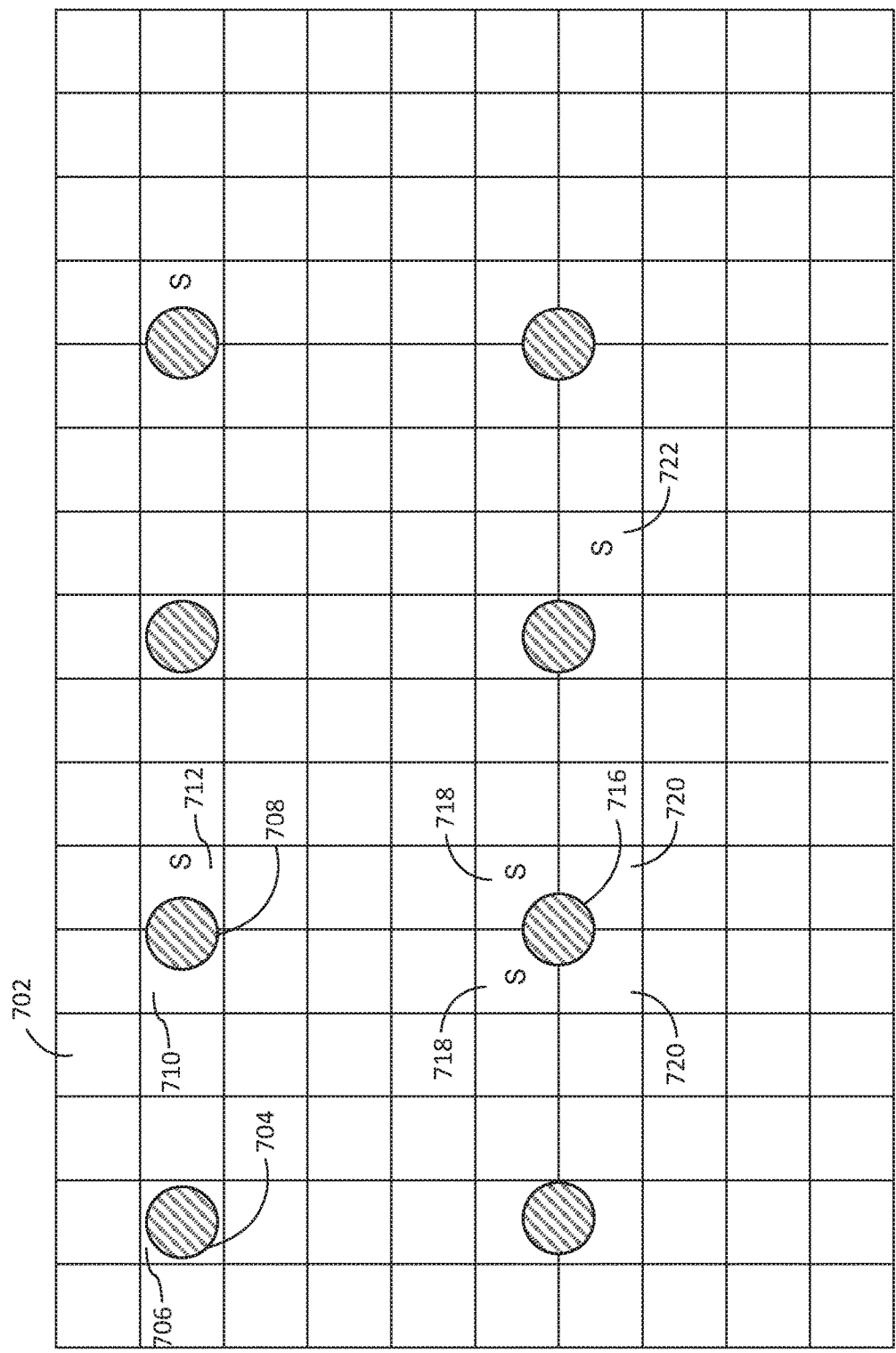
FIG. 7 illustrates another example of an array of optical sensing elements with superimposed collimator apertures, and with certain sensor elements being be configured for automatic gain and exposure control.

FIG. 7 illustrates another example of an optical sensor array 700 having various individual sensing elements 702. The optical sensor array 700 is disposed below a collimator having openings depicted by the shaded circles, e.g., 704. As can be seen, in the example, the collimator openings are generally not entirely aligned with the optical sensing elements. For example, collimator opening 704 is directly above sensing element 706. However, collimator opening 708 is above two adjacent sensing elements, e.g., sensing elements 710 and 712. In this example, masked sensing elements S may be used in those instances where the collimator opening is disposed over multiple sensing elements. Thus, for example, sensing element 712 may be used as a masked sensing element. Sensing element 706, which is the only pixel below collimator opening 704 is an unmasked sensing element. Sensing element 710, which is adjacent to masked sensing element 712 is also unmasked.

In yet other instances a collimator opening may be disposed above more than two sensing elements, such as shown with reference to collimator opening 716. In such instances, one or more sensing elements 718 disposed below the collimator opening may be used as masked sensing elements S. One or more sensing elements 720 may be unmasked and used for object imaging.

Moreover, it is possible that a sensing element, such as sensing element 722 is not below a collimator element, but is close enough to receive enough light to be useful as a special sensing element. Thus, sensing element 722 may be configured as a masked sensing element and also be used for measurements for gain and exposure control. It will also be appreciated that the location of a given sensing element relative to the light filter layer, when present, may obviate the need to use a light blocking mask to use a sensing element as a special sensing element. For example, a collimator will naturally block light for sensing elements that are not directly underneath a collimator aperture thereby limiting or eliminating the need for a separate blocking mask in certain circumstances.

As with other examples, unmasked sensing elements are used for normal input object imaging whereas masked pixels are generally used for taking readings used in connection with gain and exposure control, or ambient light detection. However, as noted above, masked sensing elements may also be used for object imaging by implementing appropriate calibration.

Further, it should be understood that in embodiments comprising a light filter layer or collimator layer, special pixels or masked pixels can be disposed in areas underneath or co-located with the light filter layer or collimator layer. Additionally, or alternatively, portion(s) of the optical sensor containing the special pixels or masked pixels can be made to be free of the light filter layer or collimator layer.

FIGS. 8A-8B illustrates examples of optical sensor arrays along with examples of locations of light blocking masks relative to the optical sensor array and where applicable light filter.

As shown in FIG. 8A, a cross section of an optical sensor 802 includes a plurality of optical sensing elements 804 and 806. Optical sensing elements 804 are unmasked. Optical sensing elements 806 are masked pixels that include blocking masks 808. The blocking masks 808 may form spatial patterns or comprise filter material as previously described in connection with FIG. 4. In the example of FIG. 8A, the blocking masks 808 are formed directly onto the optical sensing elements 806 and may be made of metal, film or any suitable material to block (reflect, absorb or occlude) light thereby limiting the amount of light reaching the sensing element underneath. The blocking masks may also be made from the CMOS sensor die.

As further shown, some or all unmasked pixels 804 may be bordered by a material 810. The inclusion of border 810 is optional, but when used provides a more consistent upper surface layer, which may aid in attaching or abutting the optical sensor to another component such as a separate filter layer.

More generally, forming the blocking masks 808 on the optical sensing elements 806 may provide certain advantages where, for example, the optical sensing elements 806 are formed on a silicon wafer. By way of example, depositing of metal on the optical sensing elements 806 can create a more uniform metal density across the entire die. Without metal coverage over the optical sensing elements, sides of the die may have a higher topology, making subsequent planarization above the optical sensing elements 806 more challenging. Placing blocking masks at some frequency across the entire imaging array provides an increase in topology having the benefit of aiding planarization. Likewise, different width metal has different yield implications, thereby offering advantages to particular metal spacing designs. As noted, borders 810 can be added to further aid in the planarization.

FIG. 8B illustrates a cross section of another example of an optical sensor 820 that includes a plurality of optical sensing elements 822 and 824. Optical sensing elements 822 are unmasked. Optical sensing elements 824 are masked sensing elements that include blocking masks 828.

The example of FIG. 8B includes light filter layer 830, which is a collimator. The collimator includes light blocking regions 826 (e.g., solid materials or stacked absorptive layers) having transparent regions which form apertures 832 (e.g., light openings, voids, or transparent materials). The light blocking region 826 is designed to absorb or occlude light at relatively wide angles. The apertures 832 can be void or transparent material and have an aspect ratio designed to restrict the angle of light reaching the sensing elements to be from a narrow cone to reduce blurring. Further, it should be understood that other optical components such as microlenses can be used instead of or in addition to the depicted light blocking and light transmitting regions.

In the embodiment of FIG. 8B, the blocking masks 828 are included within the apertures 832 of the collimator.

It will be appreciated that the collimator may be a separate layer or may be formed integral with the optical sensor 820. For example, the collimator may be made by drilling or etching material within a CMOS sensor die. Alternatively, the collimator may be made separately and affixed directly to the CMOS sensor die or formed directly on the optical sensor 820 using a wafer level process.

It should be noted that systems and methods described herein can be useful for purposes other than adjusting an operating point of the optical sensor for imaging. For example, the embodiment shown in FIG. 5 can be used to provide an integrated imager and ambient light detector in the same sensor, with some pixels used for imaging and special pixels 502 used for ambient light detection. The ambient light detection can then in turn be used for any function of the electronic system where an ambient light determination is useful. For example, a display brightness can be adjusted based on an ambient light condition detected with the special pixels 502 of the optical sensor. Alternatively, some other operating point of the electronic system can be adjusted based on the ambient light determination. In some examples, the ambient light condition determination can be used as a proxy for determining presence of an object covering the sensor, where presence of an object corresponds to a low ambient light determination based on the object blocking light from reaching the special pixels. By way of example, this can be useful for determining presence of a fingerprint over the sensor to initialize fingerprint imaging (e.g., low power wake up detection), or alternatively, this can be useful to determine presence of a face (e.g., pressed against the sensor during a phone call) to suppress or deactivate other components, such as a touch screen or a display. Further, in any of these examples the optical sensor can optionally be configured to operate in at least two different modes. In one mode the optical sensor images an input object while in another mode the optical sensor determines an ambient light condition based on the subset of special pixels 502, without a need for determining an image from the remaining pixels of the array. Moreover, the system and method can be used for any optical image sensor. For example, a 3D structured light, Time-of-Flight image sensor or LIDAR imagers, all used for depth imaging in automotive and mobile markets, and other applications that have a similar need to measure ambient light.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Example embodiments are described herein. Variations of those embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An optical imaging device for imaging an input object, comprising:
   an optical sensor array including an array of sensing elements; and
   a control circuit, wherein the control circuit is configured to:
   first read a first subset of sensing elements in the array of sensing elements, wherein the first subset of sensing elements comprises less than all sensing elements in the array of sensing elements;
   analyze the first read of the first subset of sensing elements to determine an ambient light condition;
   first alter an operating point of the optical imaging device based on the ambient light condition; and
   image the input object.

2. The optical imaging device of claim 1, wherein the ambient light condition corresponds to one or more sensing elements of the first subset of sensing elements being saturated.

3. The optical imaging device of claim 1, wherein the control circuit is configured to alter the operating point by adjusting at least one of gain or an exposure time.

4. The optical imaging device of claim 3, wherein the control circuit is configured to adjust the at least one of the gain or the exposure time to values corresponding to imaging the input object in bright light.

5. The optical imaging device of claim 3, wherein the control circuit is further configured to:
   second read the first subset of sensing elements following the first alter the operating point and prior to the image the input object.

6. The optical imaging device of claim 1, wherein the first subset of sensing elements comprises a plurality of spaced apart rows of the optical sensor array.

7. The optical imaging device of claim 6, wherein the plurality of spaced apart rows include sensing elements disposed proximate to edges and a center of the optical sensor array.

8. The optical imaging device of claim 1, further comprising a collimator disposed above the optical sensor array.

9. A method of imaging an input object using an optical sensor array having a plurality of optical sensing elements, comprising:
   first reading a subset of sensing elements in the optical sensor array, wherein the subset of sensing elements comprises less than all sensing elements in the plurality of optical sensing elements;
   analyzing the first reading of the subset of sensing elements to determine an ambient light condition;
   altering an operating point based on the ambient light condition; and
   imaging the input object using the optical sensor array.

10. The method of claim 9, wherein the ambient light condition corresponds to one or more sensing elements of the subset of sensing elements being saturated.

11. The method of claim 9, wherein the altering the operating point comprises adjusting at least one of gain or exposure of the optical sensor array.

12. The method of claim 9, wherein the subset of sensing elements are configured to receive light through a collimator.

13. The method of claim 9, further comprising:
   second reading the subset of sensing elements in the optical sensor array after altering the operating point and before imaging the input object.

14. The method of claim 9, wherein at least some of the subset of sensing elements are disposed proximate to edges of the optical sensor array.

15. The method of claim 9, wherein at least some of the subset of sensing elements are disposed proximate to a center of the optical sensor array.

16. An electronic device, comprising:
   an optical sensor array including an array of sensing elements; and
   a control circuit, wherein the control circuit is configured to:
   read a subset of sensing elements in the array of sensing elements, wherein the subset of sensing elements comprises less than all sensing elements in the array of sensing elements;
   analyze the read of the subset of sensing elements to determine an ambient light condition;
   alter operation of the electronic device based on the ambient light condition.

17. The electronic device of claim 16, wherein the electronic device further comprises a display and wherein the alter operation of the electronic device comprises adjusting a brightness of the display based on the ambient light condition.

18. The electronic device of claim 16, wherein the alter operation of the electronic device further comprises initiation of a low power wake up detection to initialize fingerprint detection.

19. The electronic device of claim 16, wherein the alter operation of the electronic device comprises selecting predetermined gain and exposure settings suitable for imaging an input object in bright light conditions.

20. The electronic device of claim 16, wherein the alter operation of the electronic device comprises stepping through stored gain and exposure settings until a majority of the subset of sensing elements are unsaturated.

* * * * *